(12) United States Patent
Evans et al.

(10) Patent No.: US 9,443,227 B2
(45) Date of Patent: *Sep. 13, 2016

(54) MESSAGING SYSTEM APPARATUSES CIRCUITS AND METHODS OF OPERATION THEREOF

(75) Inventors: Jeffrey Evans, Calabasas, CA (US);
Brad Brooks, Beverly-Hills, CA (US)

(73) Assignee: TigerText, Inc., Santa Monica, CA (US)

(*) Notice: Subject to any disclaimer, the term of this patent is extended or adjusted under 35 U.S.C. 154(b) by 67 days.

This patent is subject to a terminal disclaimer.

(21) Appl. No.: 13/063,763

(22) PCT Filed: Feb. 15, 2011

(86) PCT No.: PCT/IB2011/050629
§ 371 (c)(1),
(2), (4) Date: Mar. 14, 2011

(87) PCT Pub. No.: WO2011/101784
PCT Pub. Date: Aug. 25, 2011

(65) Prior Publication Data
US 2012/0209924 A1    Aug. 16, 2012

Related U.S. Application Data

(60) Provisional application No. 61/381,141, filed on Sep. 9, 2010, provisional application No. 61/304,810, filed on Feb. 16, 2010.

(51) Int. Cl.
*G06F 15/16*    (2006.01)
*G06Q 10/10*    (2012.01)
(Continued)

(52) U.S. Cl.
CPC .......... *G06Q 10/107* (2013.01); *H04L 12/584* (2013.01); *H04L 12/5855* (2013.01); *H04L 51/08* (2013.01); *H04L 51/14* (2013.01); *H04L 63/102* (2013.01)

(58) Field of Classification Search
CPC    G06F 21/6218; G06Q 10/00; G06Q 10/107; H04L 12/585; H04L 12/5855; H04L 12/5885; H04L 51/18; H04L 63/105
USPC ........ 713/166, 176; 709/206, 238, 203, 207; 705/2; 455/466, 412.2; 707/100; 726/1, 726/28

See application file for complete search history.

(56) References Cited

U.S. PATENT DOCUMENTS 5,958,005 A * 9/1999 Thorne et al. ................. 709/202
6,721,784 B1 * 4/2004 Leonard et al. .............. 709/206

(Continued)

OTHER PUBLICATIONS

Messaging and Online Collaboration News, http:/www/eweek.com/c/a/Messaging-and-Collaboration/Stealth Text-Should-You-Choose . . . , (printed from the internet May 22, 2012).

*Primary Examiner* — Dustin Nguyen
(74) *Attorney, Agent, or Firm* — White and Williams LLP

(57) ABSTRACT

A messaging system may include a messaging client device that may be configured to receive an impermanent text message and may be further configured to manage the impermanent text message in accordance with a message management policy associated with the impermanent text message. The messaging system may further include an impermanent messaging server configured to validate the messaging client device as complying with the message management policy prior to authorizing a transmission of the impermanent text message to the messaging client device. The messaging system may include a distributed network gateway server configured to validate the messaging client device as complying with a message management policy prior to authorizing transmission of the impermanent text message to the messaging client device.

24 Claims, 19 Drawing Sheets

(51) Int. Cl.
*H04L 12/58* (2006.01)
*H04L 29/06* (2006.01)

(56) References Cited

U.S. PATENT DOCUMENTS

| | | | |
|---|---|---|---|
| 7,293,175 B2 * | 11/2007 | Brown et al. | 713/166 |
| 7,356,564 B2 | 4/2008 | Hartselle et al. | |
| 7,523,314 B2 * | 4/2009 | Spies et al. | 713/176 |
| 7,568,098 B2 * | 7/2009 | Yeates et al. | 713/171 |
| 7,814,158 B2 * | 10/2010 | Malik | 709/206 |
| 8,364,764 B2 | 1/2013 | Hartselle et al. | |
| 8,478,825 B2 * | 7/2013 | Gustafsson et al. | 709/206 |
| 8,635,285 B2 * | 1/2014 | D'Amato et al. | 709/206 |
| 2002/0026487 A1 * | 2/2002 | Ogilvie et al. | 709/206 |
| 2002/0032742 A1 * | 3/2002 | Anderson | 709/206 |
| 2002/0161775 A1 * | 10/2002 | Lasensky et al. | 707/100 |
| 2003/0126215 A1 * | 7/2003 | Udell et al. | 709/206 |
| 2004/0172454 A1 * | 9/2004 | Appelman et al. | 709/206 |
| 2004/0260710 A1 | 12/2004 | Marston et al. | |
| 2005/0188026 A1 * | 8/2005 | Hilbert et al. | 709/206 |
| 2005/0198165 A1 | 9/2005 | Reddel et al. | |
| 2006/0019639 A1 * | 1/2006 | Adams | G06Q 10/107 455/412.2 |
| 2007/0226367 A1 * | 9/2007 | Cai | H04L 12/585 709/238 |
| 2008/0281930 A1 * | 11/2008 | Hartselle et al. | 709/206 |
| 2008/0294586 A1 * | 11/2008 | Lim | 706/47 |
| 2009/0031393 A1 * | 1/2009 | Denner | G06Q 10/00 726/1 |
| 2009/0254610 A1 | 10/2009 | Arthursson | |
| 2009/0254971 A1 | 10/2009 | Herz et al. | |
| 2009/0281829 A1 * | 11/2009 | Hansen et al. | 705/2 |
| 2010/0042690 A1 | 2/2010 | Wall | |
| 2010/0304766 A1 * | 12/2010 | Goyal | 455/466 |
| 2010/0313276 A1 * | 12/2010 | Banti | G06F 21/6218 726/28 |
| 2011/0126126 A1 | 5/2011 | Blair | |
| 2013/0159436 A1 | 6/2013 | Hartselle et al. | |

* cited by examiner

Fig. 1

Message Content

Jack, please sell all stock

Recipient Designator e.g. jack@email.com / +1 234 567890

Message Expiration Attributes

After XXX Hours from Message Creation/Sending/Receipt Time

After XXX Views by Recipient

After Receiving Device has Entered/Left the following Location(s) XXX

Enforce/Do not Enforce on

Messages Containing the Following Text/Keywords XXX

Messages which are In-Family/String/Link to a Message Containing the Following Text/Keyword(s) XXX Message's Recipient is a Member of the Following Group(s) XXX Message's Recipient Role/Position is the Following Role(s) XXX

Deletion/Function-Limitation

Delete Message (i.e. All Functionalities Lost)

Do Not Allow Printing

Do Not Allow Forwarding

Do Not Allow Saving

Do Not Allow Copying

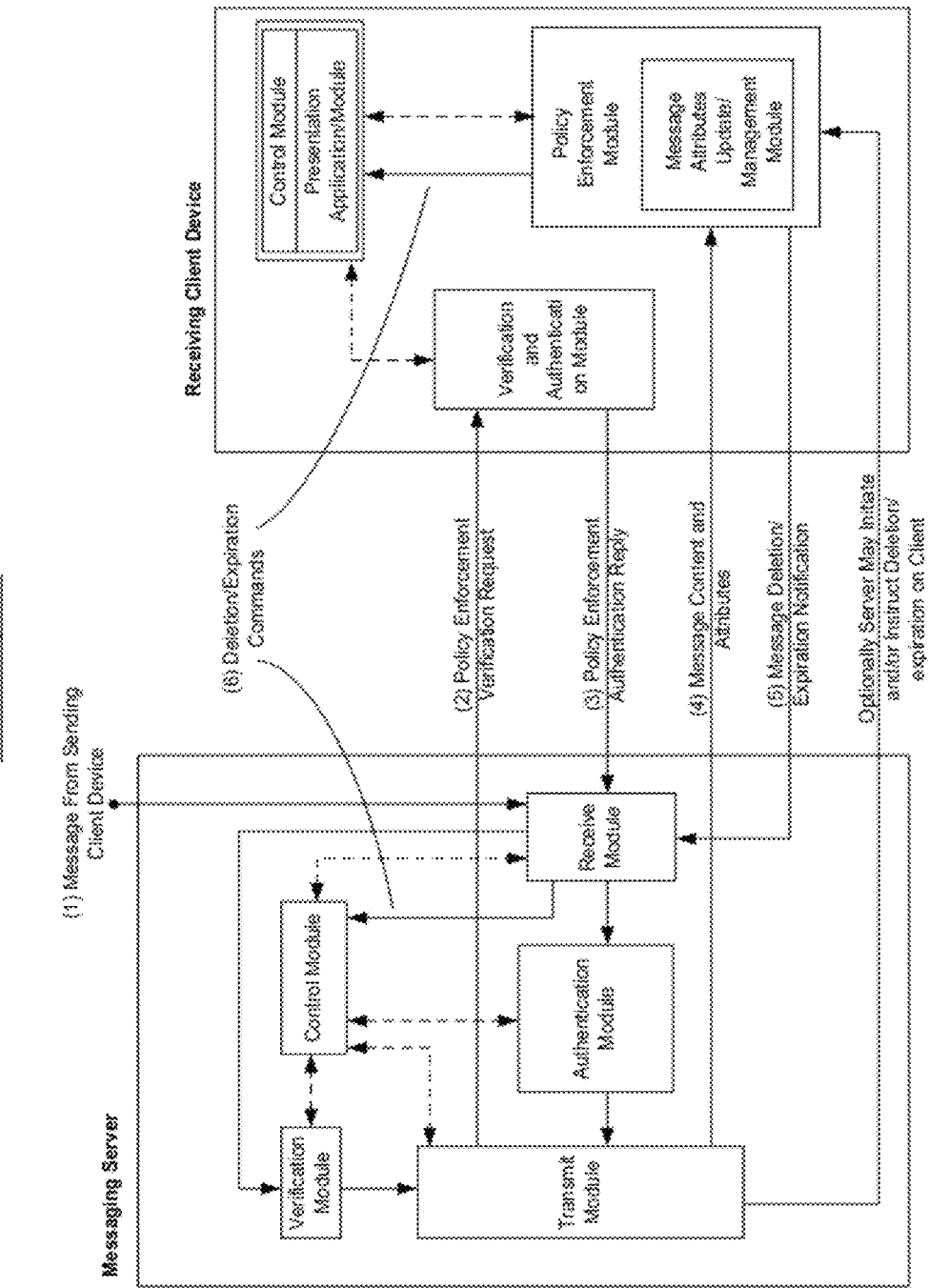

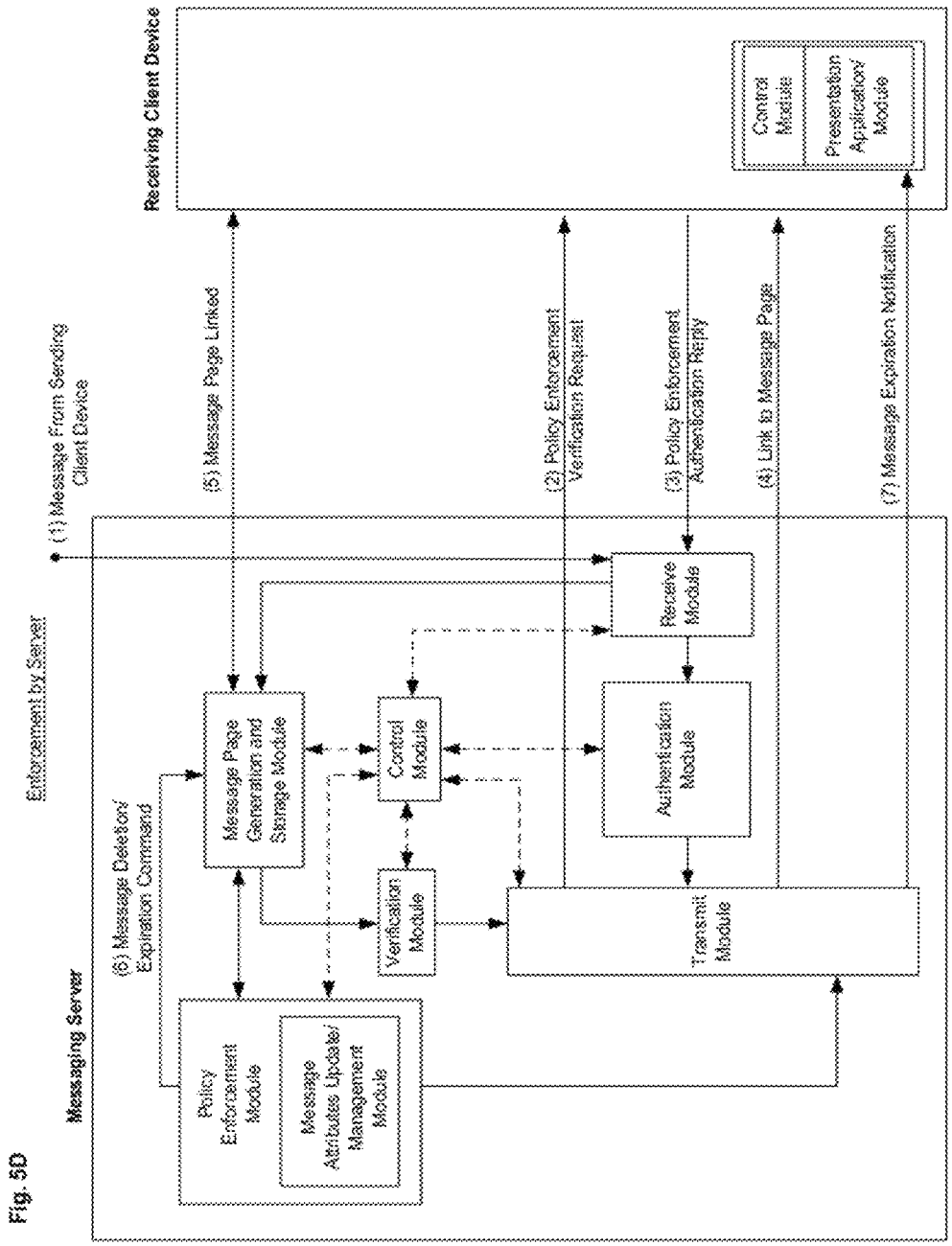

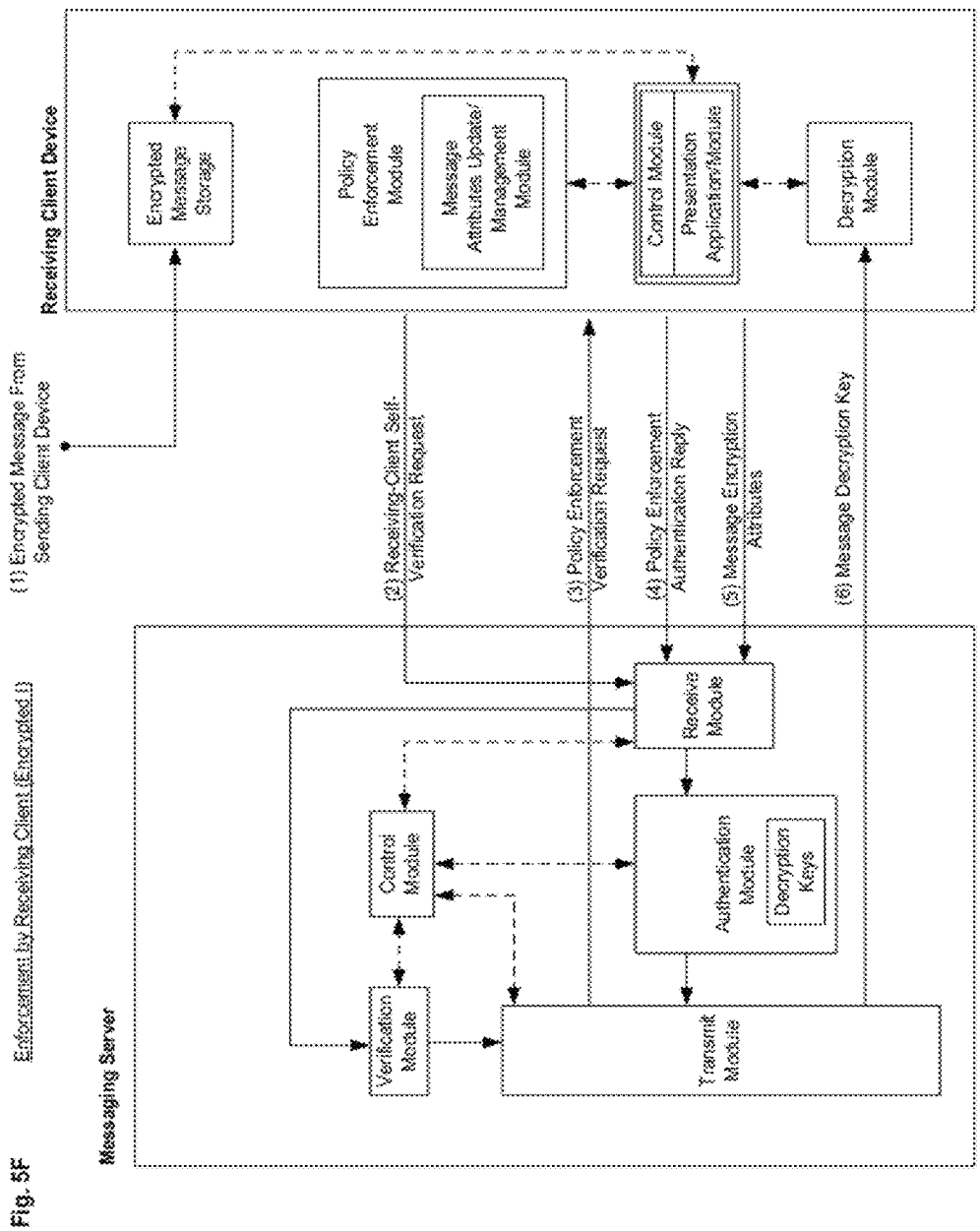
Fig. 5F    Enforcement by Receiving Client (Encrypted 1)

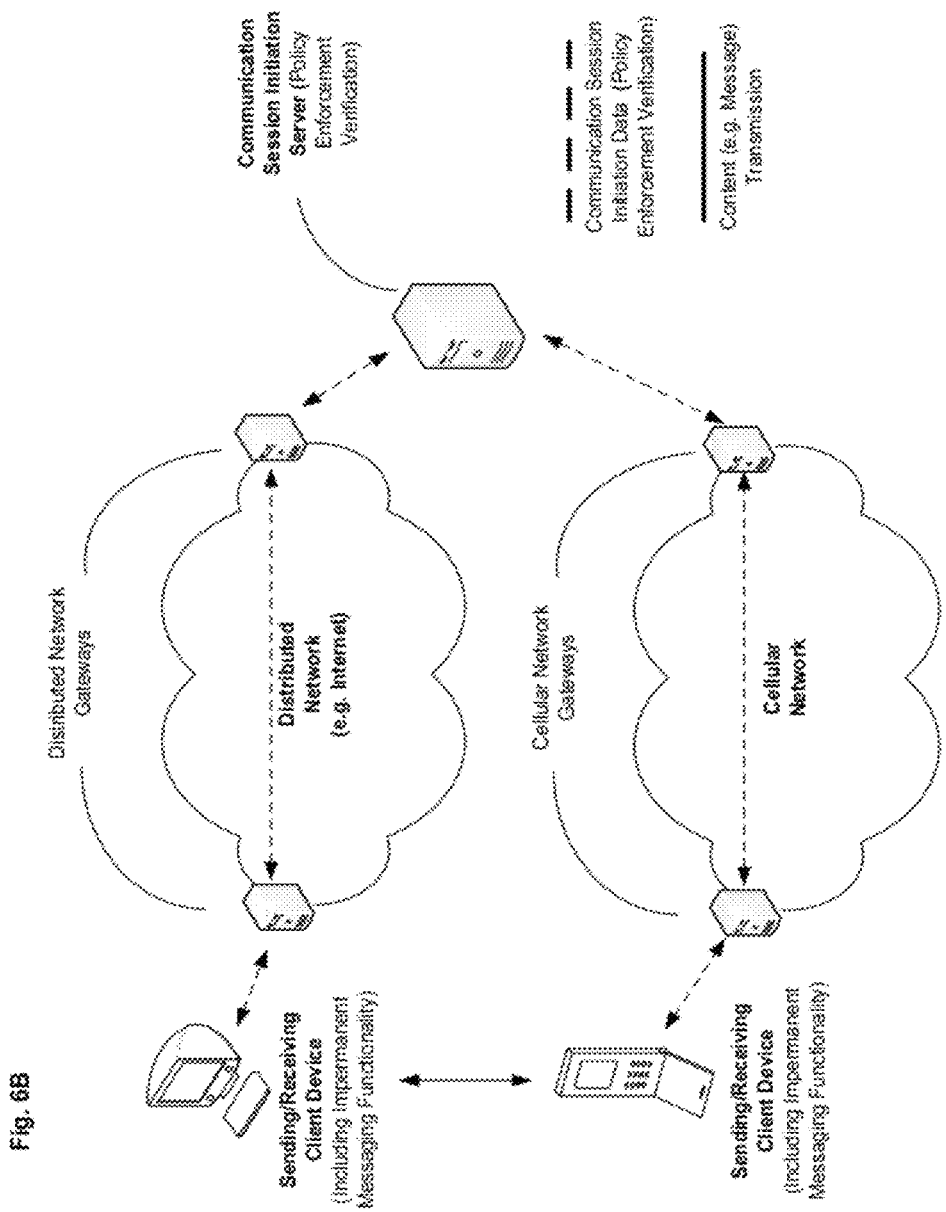

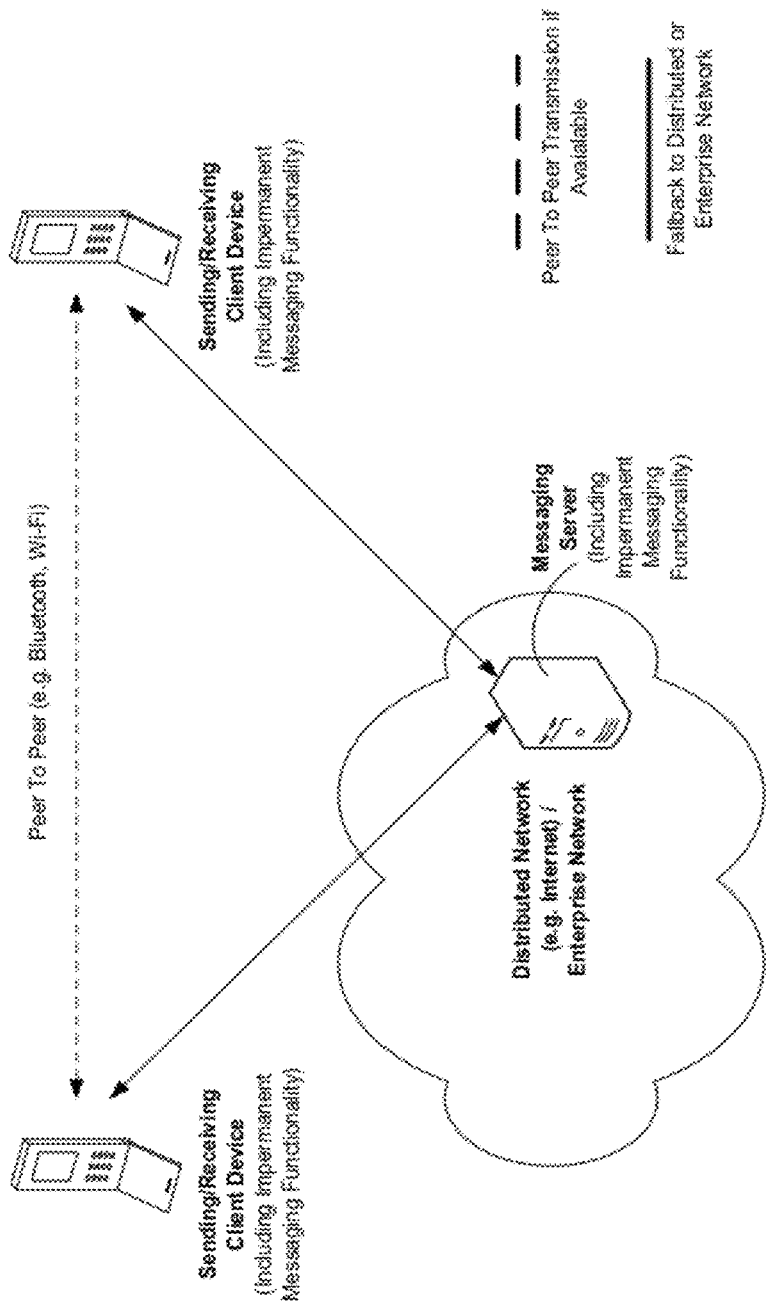

MESSAGING SYSTEM APPARATUSES CIRCUITS AND METHODS OF OPERATION THEREOF

FIELD OF THE INVENTION

The present invention generally relates to a messaging system, apparatuses circuits and methods of operation thereof. More specifically, the present invention relates to a messaging system wherein one or more of the messages contain message attributes, defining the characteristics of parameters such as the message's lifespan, accessibility and/or functionality.

BACKGROUND

More than 2.5 billion text messages are sent in the U.S. daily, with consumers often using text messages or e-mails to replace casual conversation and businesses increasingly relying on mobile messaging as means of instructing and updating staff with regard to enterprise related matters. Various other messaging platforms and techniques have been developed and are in the works. However, a common deficiency of all known current messaging types and platforms is that once a message has been sent out and was received at a recipient device, no further intervention by the sender relating to any of the message's content and characteristics can be made.

Taking the above into account, there clearly remains a need for better and more efficient messaging systems, apparatuses, circuits and methods of operation thereof, that may allow for the expiration (e.g. deletion) of a message and/or the manipulation of a message's characteristics (e.g. functionality limitation) after it was received at its destination.

SUMMARY OF THE INVENTION

Below are described a number of novel, innovative features of a messaging system, apparatuses circuits and methods of operation thereof.

The present invention is a messaging system, apparatuses circuits and methods of operation thereof. A message, in accordance with some embodiments of the present invention, may comprise one or more message attributes, defining the characteristics of parameters such as its lifespan, accessibility and/or functionality. The message attributes may include, for example, limitations relating to the time duration through which the message may be accessed, the number of times the message may be accessed, the geographical area in which the message may be accessed, the ability to print the message, the ability to save the message, the ability to forward the message and/or any other way in which the message's functionality may be limited.

According to some embodiments of the present invention, the message attributes may be defined/authored by a user of a sending client device. According to some embodiments of the present invention, a messaging server may append and/or add additional message attributes to a message, and/or edit message attributes defined/authored by the user of the sending client device. According to some embodiments of the present invention, a message authoring application may allow for the user of the sending client device to compose and/or edit the message's content and attributes.

According to some embodiments of the present invention, one or more message attributes policies each comprising one or more message functionality limitations may be defined. The message attributes policies may be enforced based, for example, on characteristics such as message content and/or recipient group/position.

According to some embodiments of the present invention, an enforcement module may be adapted to enforce the message attributes. According to some embodiments, a receiving client device may comprise an enforcement module adapted to enforce the message attributes on some or all of its incoming messages. The enforcement module may erase and/or limit the functionality of a given message based on its message attributes, substantially at the time of receipt and/or as certain attribute defined threshold(s) is/are met (e.g. delete the message once a certain amount of time has passed from its time of receipt). According to some embodiments of the present invention, the messaging server may comprise an authentication module and/or a verification module adapted to authenticate the receiving client device and/or to verify its message attribute enforcement capabilities (e.g. the existence/functionality of its enforcement module circuit/application), prior to forwarding a message to it.

According to some embodiments of the present invention, the messaging server may send the receiving client device a floating agent application installation file, adapted to install itself on the receiving client device and to enforce the message attributes, prior to forwarding the message to it. Once a floating agent application installation notification, confirming the installation of the floating agent on the receiving client device, is received by the messaging server, the server may proceed to forward the message to the receiving client device. The now installed floating agent application may enforce the message attributes.

According to some embodiments of the present invention, relating to direct device to device communications, for example, peer to peer type networks; the sending client device may comprise an authentication module and/or a verification module adapted to authenticate the receiving client device and/or to verify its message attribute enforcement capabilities (e.g. the existence/functionality of its enforcement module circuit/application). Once the receiving client device has been authenticated/verified, the sending client device may send the message directly to it. The receiving client device's policy enforcement module may issue an expiration, functionality-limitation and/or deletion command upon expiration of one or more of the message's expiration attributes.

According to some embodiments of the present invention, the messaging server may comprise an enforcement module adapted to enforce the message attributes on some or all of its incoming messages. The enforcement module may erase and/or limit the functionality of a given message based its message attributes, substantially at the time of receipt and/or as certain attribute defined threshold(s) is/are met (e.g. delete the message once a certain amount of time has passed from its time of receipt). The messaging server may comprise a message page generation and storage module adapted to generate and store a browser renderable code (e.g. HTML page, WAP page), herein code includes message content. The messaging server may then send the receiving client device a link to the message content including page. The messaging server's enforcement module may check and possibly update a given message's attribute(s) intermittently (e.g. as time to expiration and deletion of a message is decreasing), each time the page including the message is linked (e.g. as the number of attribute allowed message views decreases with each linkage to it) and/or as a result of an external intervention by an administrator/owner using an attribute update/management module, of the messaging server, adapted to allow for deleting, editing and/or appending message attributes and/or message attribute policies. Upon expiration of one or more message attributes, and possibly the deletion of the message, a message deletion/expiration notification may be send to the receiving client device by the messaging server.

According to some embodiments of the present invention, an attribute containing message may be encrypted by the sending client device prior to its sending. The message may be decrypted by the receiving client device, by the messaging server or by combination of both the client receiving device and the messaging server (e.g. server holds public decryption keys, server acts as the certificate authority).

According to some embodiments of the present invention, exemplary system configurations for handling and communicating impermanent and/or function-limiting attribute(s) containing messages may include: direct device to device communication configurations; configurations wherein client devices may directly send/receive impermanent/function-limiting messages to each other. Impermanent/function-limiting messaging functionality enforcement verification data is initially communicated over one or more cellular and/or one or more distributed networks between the two client devices; configurations wherein some or all of the messaging system functionalities may be implemented on a cellular and/or distributed network's gateway or gatekeeper server(s); configurations wherein cellular network gateways comprise impermanent/function-limiting messaging functionality; configurations wherein client devices of one or more cellular networks and/or distributed networks may send/receive impermanent/function-limiting messages to each other; configurations wherein client devices of different cellular networks may send/receive impermanent/function-limiting messages to each other; configuration wherein client devices of similar and/or different enterprise networks may send/receive impermanent/function-limiting messages to each other; and direct device to device communication configurations (e.g. peer to peer) wherein each sending and/or receiving device may comprise impermanent/function-limiting messaging functionality, and sending/receiving client devices may be adapted to fallback to a distributed network (e.g. Internet, cellular) and/or an enterprise communication network, when direct transmission functionality is unavailable.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying figures:

In FIG. 1 there is shown, in accordance with some embodiments of the present invention, an exemplary structure of a message;

In FIG. 5A there is shown, in accordance with some embodiments of the present invention, an exemplary configuration where the receiving client device is adapted to enforce the message attributes;

In FIG. 5D there is shown, in accordance with some embodiments of the present invention, an exemplary configuration where the messaging server comprises a message attribute enforcement module;

In FIG. 5F there is shown, in accordance with some embodiments of the present invention, an exemplary configuration where an attribute(s) containing message may be sent directly from the sending client device to the receiving client device, in an encrypted form;

DETAILED DESCRIPTION

Figure 2:
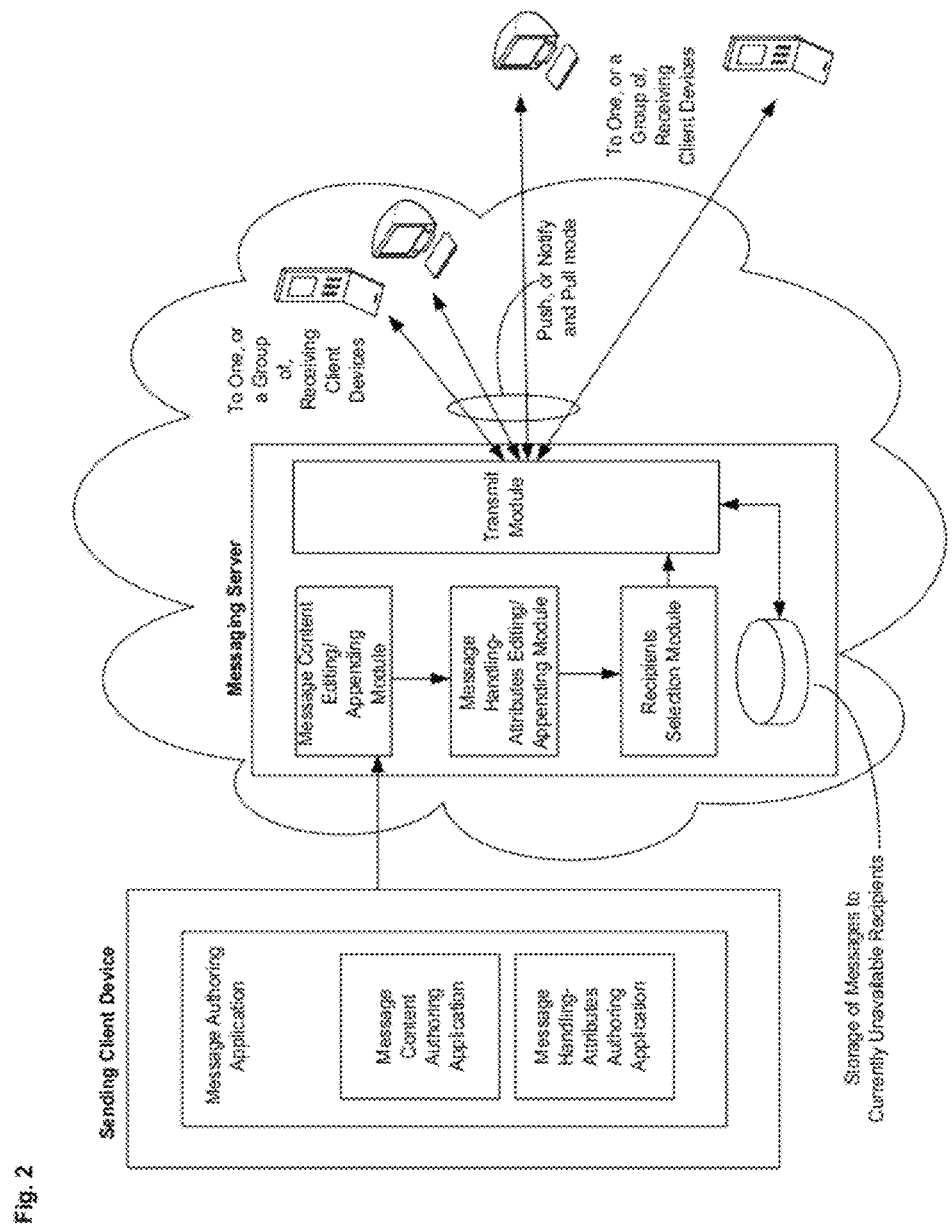
In FIG. 2 there is shown, in accordance with some embodiments of the present invention, a sending client device comprising a message authoring application for authoring message content and/or message handling attributes.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a messaging system, apparatuses circuits and methods of operation thereof. A message, in accordance with some embodiments of the present invention, may comprise one or more message attributes, defining the characteristics of parameters such as its lifespan, accessibility and/or functionality. The message attributes may include, for example, limitations relating to the time duration through which the message may be accessed, the number of times the message may be accessed, the geographical area in which the message may be accessed, the ability to print the message, the ability to save the message, the ability to forward the message and/or any other way in which the message's functionality may be limited.

In FIG. 1 there is shown, in accordance with some embodiments of the present invention, an exemplary structure of a message comprising: the message's content, the recipient designator(s), the message expiration attributes, message attribute enforcement policies defining the scope of enforcement and the message functionalities to be limited as attribute threshold(s) are met. It is made clear that a message, in accordance with some embodiments of the present invention, may be sent to one or more recipients or receiving client devices and may contain or have attachments containing any type of content(s) (e.g. text, images, video, audio). According to some embodiments, as part of limiting a given message's functionality, the quality of one or more of its contained/attached content(s) (e.g. text, images, video, audio) may be degraded. Furthermore, the terms 'message' and/or 'impermanent message', as used hereinafter, may relate to any message or type of message associated with one or more attribute(s) and/or policy(ies), which attribute(s) and/or policy(ies) may define the characteristics of one or more parameters such as the message's lifespan, accessibility and/or functionality.

According to some embodiments of the present invention, the message attributes may be defined/authored by a user of a sending client device. According to some embodiments of the present invention, a messaging server may append and/or add additional message attributes to a message, and/or edit message attributes defined/authored by the user of the sending client device. According to some embodiments of the present invention, a message authoring application may allow for the user of the sending client device to compose and/or edit the message's content and attributes.

In FIG. 2 there is shown, in accordance with some embodiments of the present invention, a sending client device comprising a message authoring application for authoring message content and/or message handling attributes. A networked messaging server may edit and/or append, or allow for editing and/or appending of, message content and/or message handling attributes. A recipient selection module may select one or more recipients or append one or more designators of recipients to which the message is intended (e.g. based on a selection made by the message author/sender). A transmit module may then send the message to one or a group of receiving client devices, corresponding to selected recipient(s), within the same network or on another accessible network. According to some embodiments, the message may be sent to the receiving client device in a 'push' mode or, alternatively, a notification informing the receipt of a new message at the server may be sent to the receiving client device, which receiving device may then 'pull' the message from the server. According to some embodiments, the messaging server may comprise a database for storing messages sent to receiving client devices which are not available (e.g. not connected to the server/in a no reception zone/not online) or for storing messages delivered in 'pull' mode, awaiting for receiving client device retrieval.

Figure 3A:
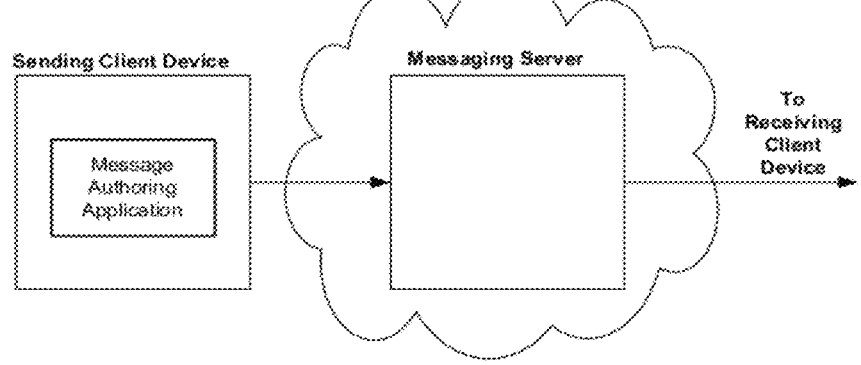
In FIG. 3A-3C there are shown, in accordance with some embodiments of the present invention, a message authoring application residing on the sending client device (3A), on the messaging server (3B) and/or on another dedicated or non-dedicated networked authoring server (3C) accessible by the sending client device.
Figure 3B:
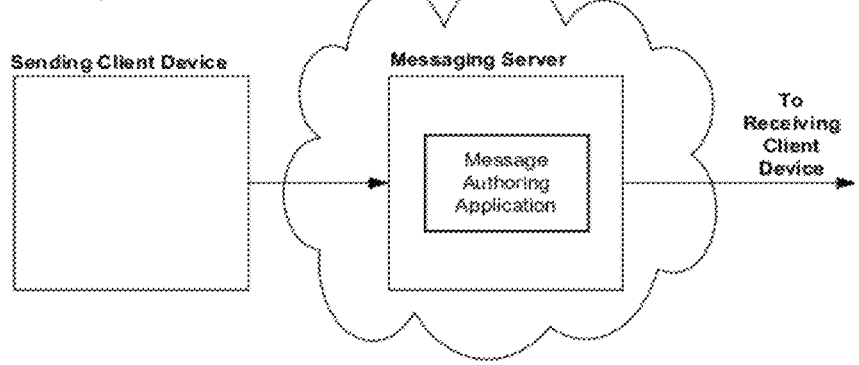
Figure 3C:
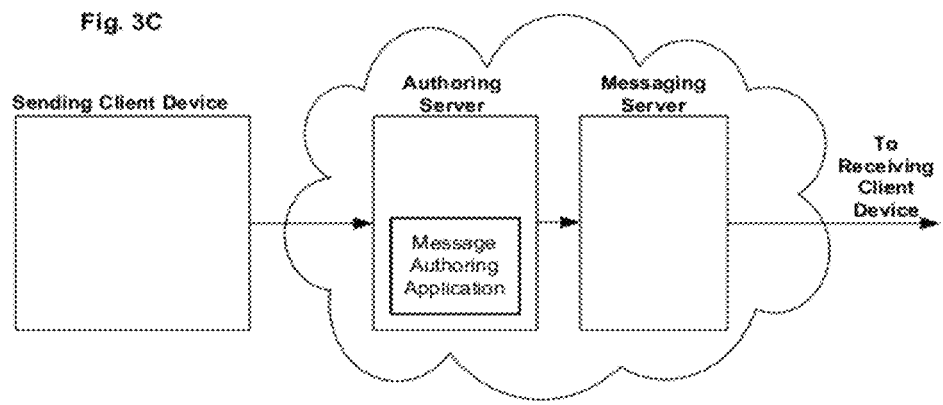

In FIG. 3A-3C there are shown, in accordance with some embodiments of the present invention, a message authoring application residing on the sending client device (3A), on the messaging server (3B) and/or on another dedicated or non-dedicated networked authoring server (3C) accessible by the sending client device. According to some embodiments, message authoring applications may reside on more than one of the above mentioned devices/servers.

Figure 4:
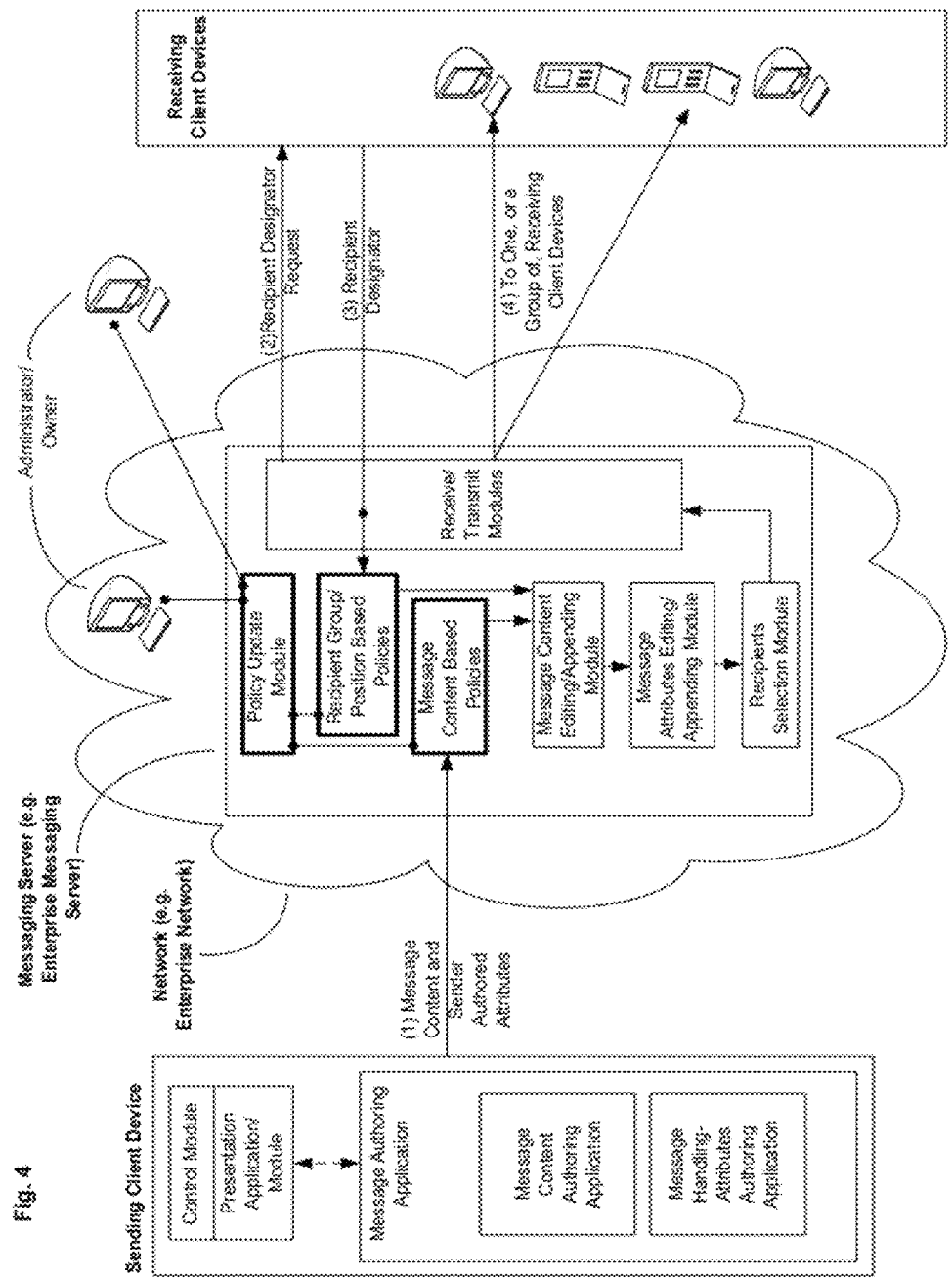
In FIG. 4 there is shown, in accordance with some embodiments of the present invention, an exemplary configuration in which a messaging server (e.g. an enterprise messaging server) is adapted to allow for message attributes policies definition and updating.

According to some embodiments of the present invention, one or more message attributes policies each comprising one or more message functionality limitations may be defined. The message attributes policies may be enforced based, for example, on characteristics such as message content and/or recipient group/position. In FIG. 4 there is shown, in accordance with some embodiments of the present invention, an exemplary configuration in which a messaging server (e.g. an enterprise messaging server) is adapted to allow for message attributes policies definition and updating. Recipient group/position based policies may be enforced based on the receiving client device(s)' designator(s) provided by the receiving client device(s), whereas message content based policies may be enforced based on the content of given messages as received by the messaging server, prior to their forwarding to the receiving device(s). A policy update module may be adapted to allow for the definition and/or updating of policies (e.g. by an administrator/owner/sender), from within the messaging server's network and/or from another network or networked administrator/owner computerized device which are connected to the messaging server's network.

According to some embodiments of the present invention, an enforcement module may be adapted to enforce the message attributes. According to some embodiments, a receiving client device may comprise an enforcement module adapted to enforce the message attributes on some or all of its incoming messages. The enforcement module may erase and/or limit the functionality of a given message based on its message attributes, substantially at the time of receipt and/or as certain attribute defined threshold(s) is/are met (e.g. delete the message once a certain amount of time has passed from its time of receipt). According to some embodiments of the present invention, the messaging server may comprise an authentication module and/or a verification module adapted to authenticate the receiving client device and/or to verify its message attribute enforcement capabilities (e.g. the existence/functionality of its enforcement module circuit/application), prior to forwarding a message to it.

In FIG. 5A there is shown, in accordance with some embodiments of the present invention, an exemplary configuration where the receiving client device is adapted to enforce the message attributes. A message from a sending client device is received by the messaging server, the messaging server then sends a policy enforcement verification request to the receiving client device. Upon receipt of a policy enforcement authentication reply, the messaging server proceeds to forward the message content and attributes to the receiving client device. When one or more of the message's attributes are expired, the receiving client device notifies the messaging server by sending it a message deletion/expiration notification. Both, the messaging server and the receiving client device may then issue deletion/expiration and/or corresponding functionality limitation commands to their respective control modules, which commands either delete completely or limit the functionality of their respective message copies. According to some embodiments, the messaging server may optionally initiate the deletion/expiration and/or function limitation of a message, and may be adapted to accordingly instruct the client device(s).

According to some embodiments of the present invention, the messaging server may send the receiving client device a floating agent application installation file, adapted to install itself on the receiving client device and to enforce the message attributes, prior to forwarding the message to it. Once a floating agent application installation notification, confirming the installation of the floating agent on the receiving client device, is received by the messaging server, the server may proceed to forward the message to the receiving client device. The now installed floating agent application may enforce the message attributes.

Figure 5B:
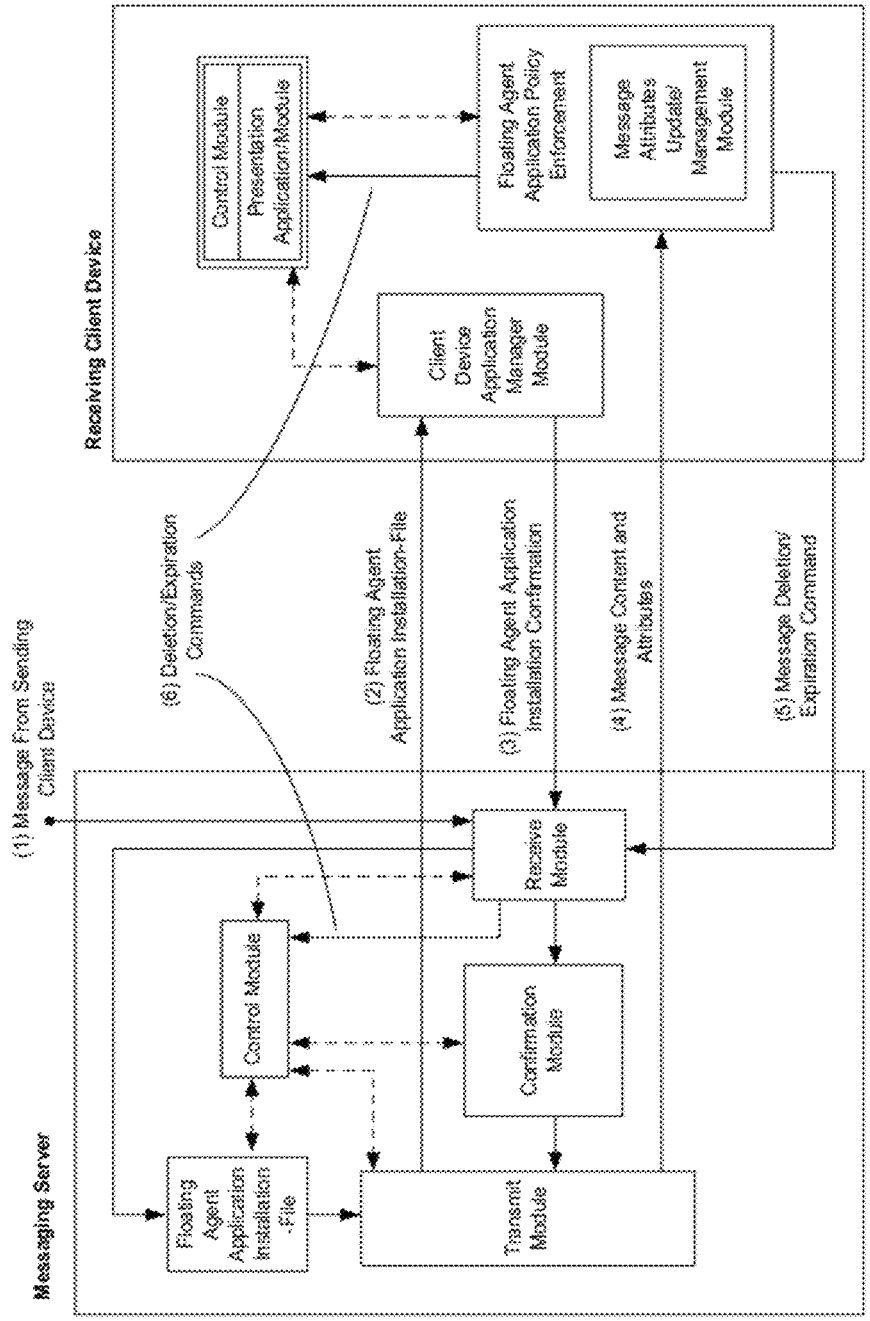
In FIG. 5B there is shown, in accordance with some embodiments of the present invention, an exemplary configuration where the messaging server is adapted to send the receiving client device a floating agent application for enforcing the message attributes.

In FIG. 5B there is shown, in accordance with some embodiments of the present invention, an exemplary configuration where the messaging server is adapted to send the receiving client device a floating agent application for enforcing the message attributes. A message from a sending client device is received by the messaging server, the messaging server then sends a floating agent application installation file to the receiving client device. Upon receipt of a floating agent application installation confirmation, the messaging server proceeds to forward the message content and attributes to the receiving client device. When one or more of the message's attributes are expired, the floating agent application issues a notice and the receiving client device notifies the messaging server by sending it a message deletion/expiration notification. Both, the messaging server and the receiving client device may then issue deletion/expiration and/or corresponding functionality limitation commands to their respective control modules, which commands either delete completely or limit the functionality of their respective message copies.

According to some embodiments of the present invention, relating to direct device to device communications, for example, peer to peer type networks; the sending client device may comprise an authentication module and/or a verification module adapted to authenticate the receiving client device and/or to verify its message attribute enforcement capabilities (e.g. the existence/functionality of its enforcement module circuit/application). Once the receiving client device has been authenticated/verified, the sending client device may send the message directly to it. The receiving client device's policy enforcement module may issue an expiration, functionality-limitation and/or deletion command upon expiration of one or more of the message's expiration attributes.

Figure 5C:
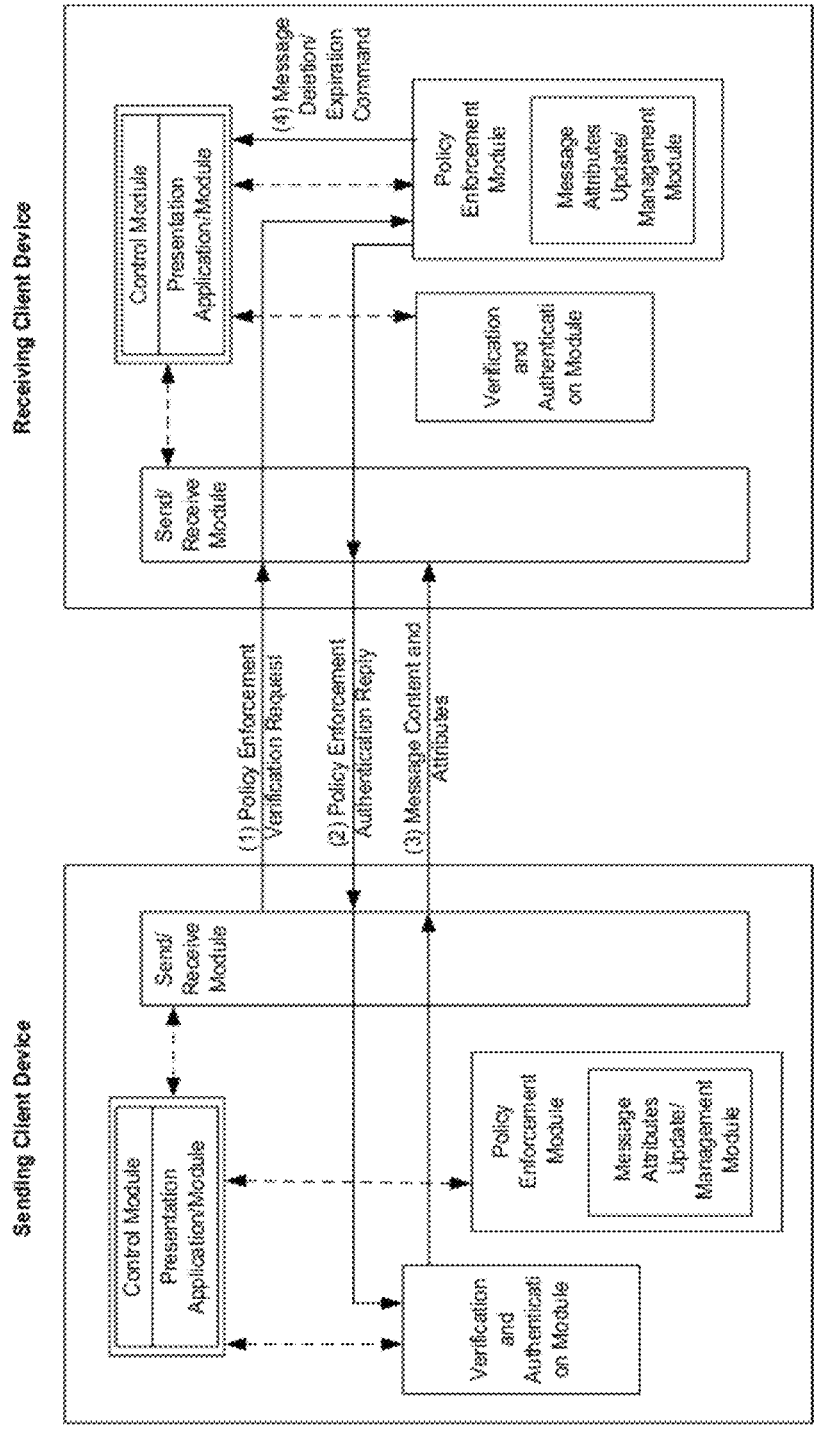
In FIG. 5C there is shown, in accordance with some embodiments of the present invention, an exemplary configuration where two client devices are adapted to send messages directly to one another.

In FIG. 5C there is shown, in accordance with some embodiments of the present invention, an exemplary configuration where two client devices are adapted to send messages directly to one another. The sending client device may send to the receiving client device a policy enforcement verification request. Upon receipt and verification/authentication of the receiving client device's policy enforcement authentication reply, the sending client device may proceed to send it the message content and attributes.

According to some embodiments of the present invention, the messaging server may comprise an enforcement module adapted to enforce the message attributes on some or all of its incoming messages. The enforcement module may erase and/or limit the functionality of a given message based its message attributes, substantially at the time of receipt and/or as certain attribute defined threshold(s) is/are met (e.g. delete the message once a certain amount of time has passed from its time of receipt). The messaging server may comprise a message page generation and storage module adapted to generate and store a browser renderable code (e.g. HTML page, WAP page), herein code includes message content. The messaging server may then send the receiving client device a link to the message content including page. The messaging server's enforcement module may check and possibly update a given message's attribute(s) intermittently (e.g. as time to expiration and deletion of a message is decreasing), each time the page including the message is linked (e.g. as the number of attribute allowed message views decreases with each linkage to it) and/or as a result of an external intervention by an administrator/owner using an attribute update/management module, of the messaging server, adapted to allow for deleting, editing and/or appending message attributes and/or message attribute policies. Upon expiration of one or more message attributes, and possibly the deletion of the message, a message deletion/expiration notification may be send to the receiving client device by the messaging server.

In FIG. 5D there is shown, in accordance with some embodiments of the present invention, an exemplary configuration where the messaging server comprises a message attribute enforcement module. A message from a sending client device is received by the messaging server and a message page (e.g. webpage) is generated and stored by a message page generation and storage module, functionally associated with the enforcement module. A link to the message page is then sent to the receiving client device which may use it access the message page and its content.

Upon expiration of one or more of the message attributes a message deletion/expiration command may be sent by the enforcement module to the message page generation and storage module, the message page generation and storage module may, in response, delete, remove or else wise limit the functionality and/or accessibility of the message including page and its included content. A message expiration notification may then be sent to the receiving client device, informing its user of the deletion/removal/limitation of functionality.

Figure 5E:
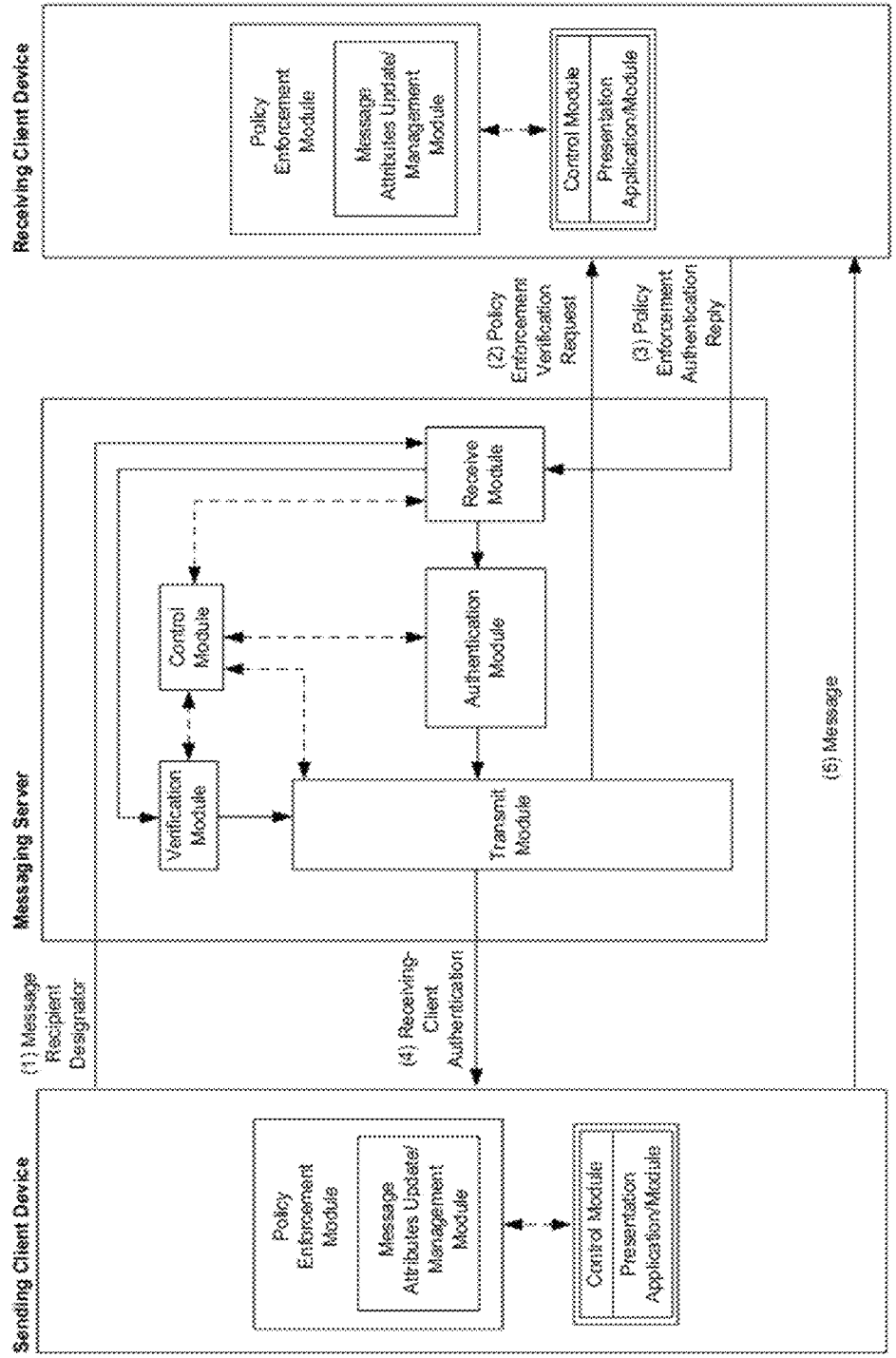
In FIG. 5E there is shown, in accordance with some embodiments of the present invention, an exemplary configuration where the client devices comprise message attribute enforcement modules and the sending client device is adapted to verify the receiving client device's ability to enforce message attributes by use of the messaging server.

In FIG. 5E there is shown, in accordance with some embodiments of the present invention, an exemplary configuration where the client devices comprise message attribute enforcement modules and the sending client device is adapted to verify the receiving client device's ability to enforce message attributes by use of the messaging server. The sending client device may initially send the message recipient designator to the messaging server. Based on the recipient designator the messaging server may send an enforcement verification request to the receiving client device. Upon receipt of an enforcement authentication reply the messaging server may send a receiving client device authentication message to the sending client device that may now proceed and send the message.

According to some embodiments of the present invention, an attribute containing message may be encrypted by the sending client device prior to its sending. In FIG. 5F there is shown, in accordance with some embodiments of the present invention, an exemplary configuration where an attribute(s) containing message may be sent directly from the sending client device to the receiving client device, in an encrypted form. The receiving client device may then send a self-verification request to the messaging server, receive in return an enforcement verification request and reply to it with an enforcement authentication reply authenticating its ability to enforce message attribute/attribute policies. Once the messaging server's authentication module and/or verification module have authenticated and verified the receiving client device as message attribute enforcement capable, the receiving client device may send the received message's encryption attributes to the messaging server and receive, in return, the corresponding message decryption key(s) to be used by its decryption module to decrypt the encrypted message. Further enforcement of the message attributes may be handled by the receiving client device enforcement module.

Figure 5G:
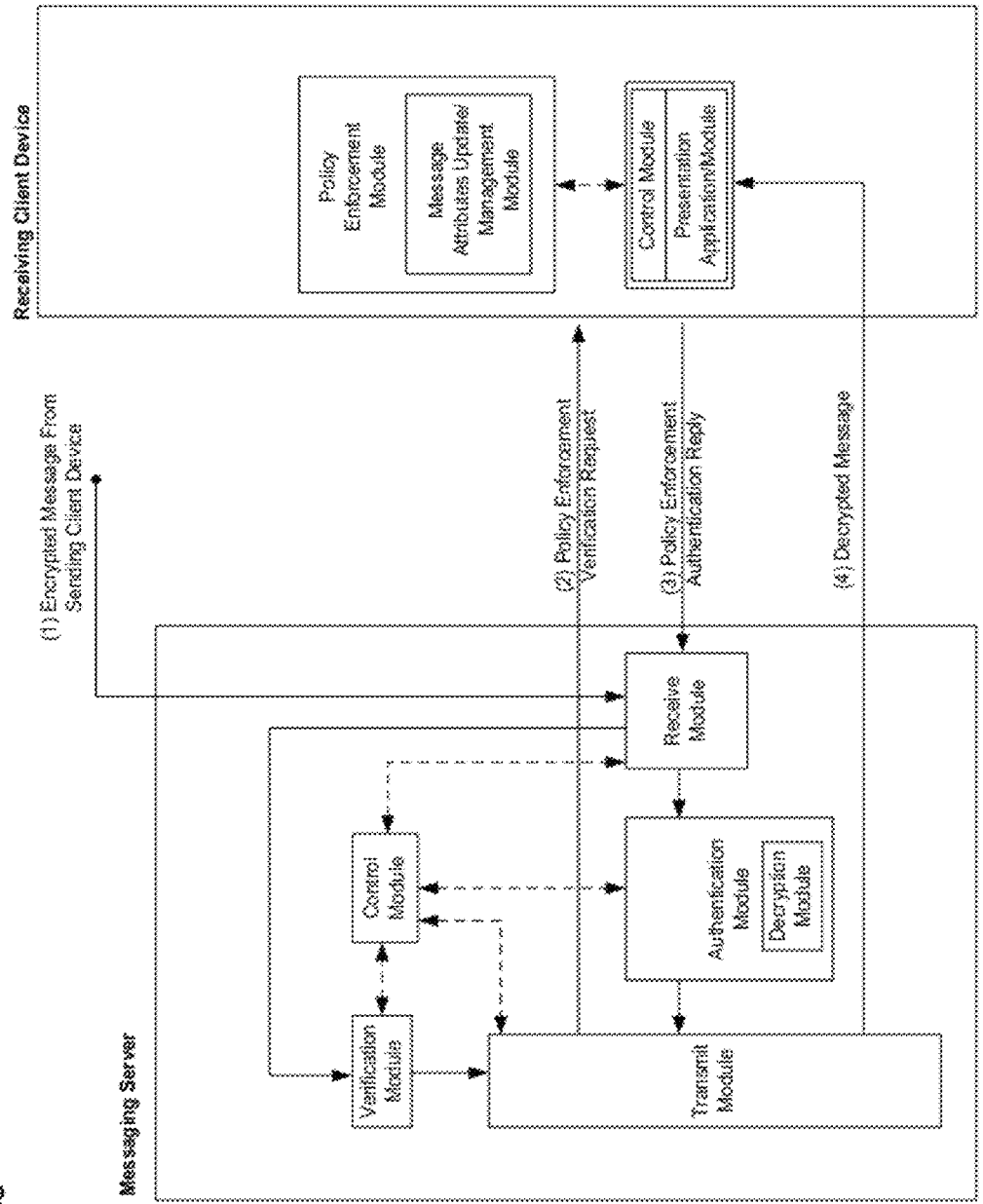
In FIG. 5G there is shown, in accordance with some embodiments of the present invention, an exemplary configuration where an attribute(s) containing message may be sent from the sending client device to the messaging server, in an encrypted form.

In FIG. 5G there is shown, in accordance with some embodiments of the present invention, an exemplary configuration where an attribute(s) containing message may be sent from the sending client device to the messaging server, in an encrypted form. The messaging server may then send an enforcement verification request to the receiving client device and receive in response an enforcement authentication reply. Once the messaging server's authentication module and/or verification module have authenticated and verified the receiving client device as message attribute enforcement capable, it may use its decryption module to decrypt the encrypted message and send it to the receiving client device. Further enforcement of the message attributes may be handled by the receiving client device enforcement module.

Figure 5H:
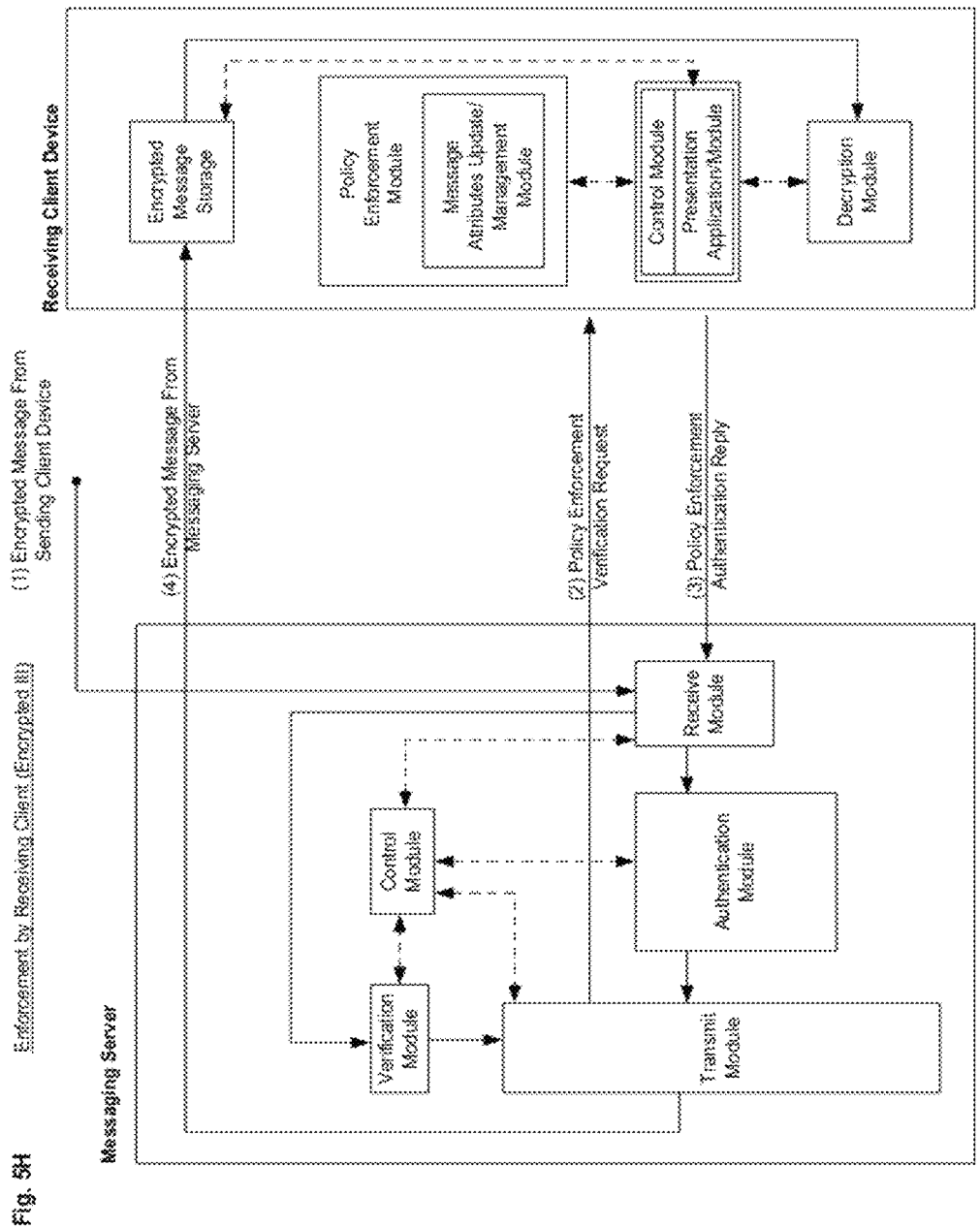
In FIG. 5H there is shown, in accordance with some embodiments of the present invention, an exemplary configuration where an attribute(s) containing message may be sent from the sending client device to the messaging server, in an encrypted form; and In FIGS. 6A-6G there are shown, in accordance with some embodiments of the present invention, a few exemplary system(s) and network(s) configurations for handling and communicating impermanent and/or function-limiting attribute(s) containing messages.

In FIG. 5H there is shown, in accordance with some embodiments of the present invention, an exemplary configuration where an attribute(s) containing message may be sent from the sending client device to the messaging server, in an encrypted form. The messaging server may then send an enforcement verification request to the receiving client device and receive in response an enforcement authentication reply. Once the messaging server's authentication module and/or verification module have authenticated and verified the receiving client device as message attribute enforcement capable, it may forward the encrypted message to the receiving client device may use its decryption module, possibly using one or more decryption keys it possesses to decrypt the encrypted message. Further enforcement of the message attributes may be handled by the receiving client device enforcement module.

In FIGS. 6A-6G there are shown, in accordance with some embodiments of the present invention, a few exemplary system(s) and network(s) configurations for handling and communicating impermanent and/or function-limiting attribute(s) containing messages.

Figure 6A:
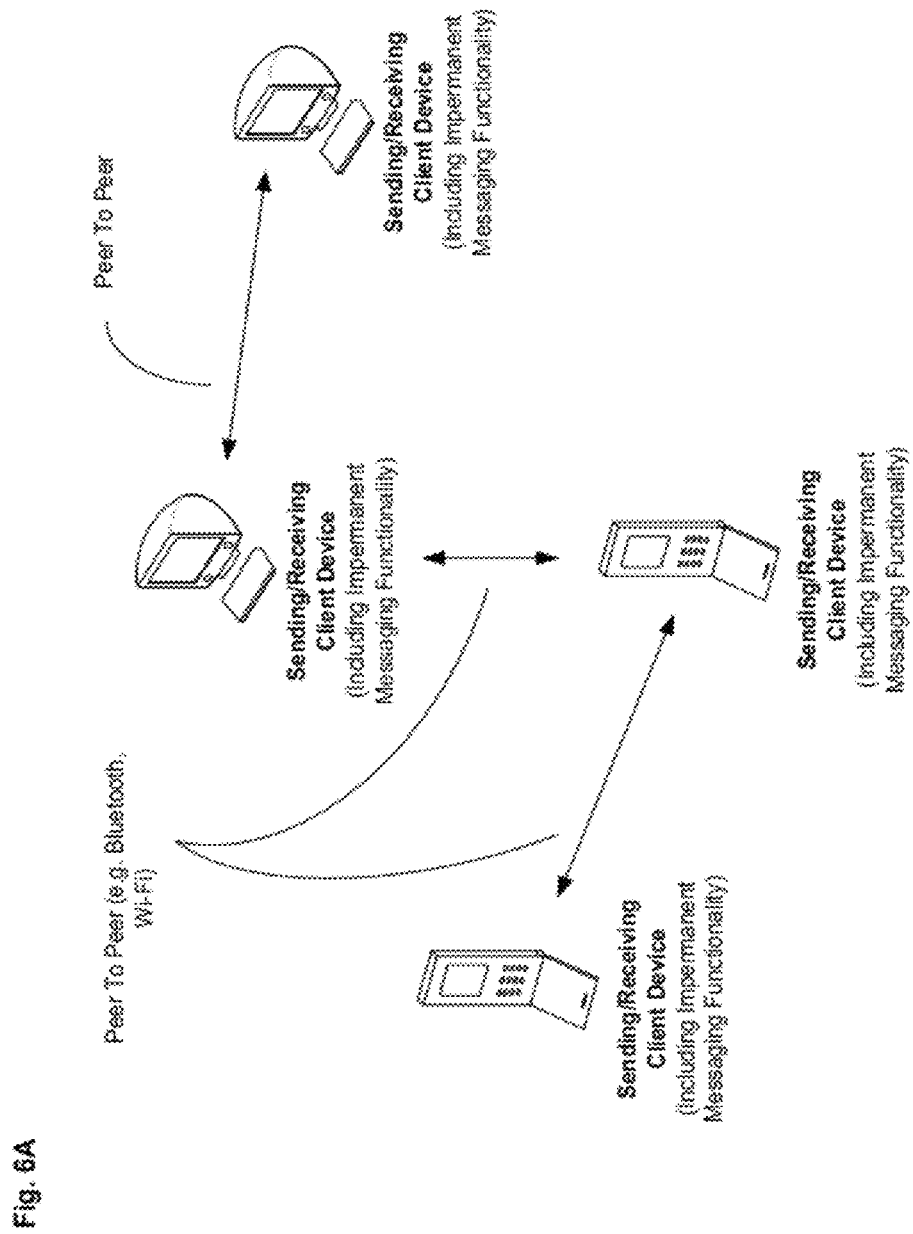

In FIG. 6A there is shown, in accordance with some embodiments of the present invention, a direct device to device communication configuration (e.g. peer to peer) wherein each sending and/or receiving device may comprise impermanent/function-limiting messaging functionality.

In FIG. 6B there is shown, in accordance with some embodiments of the present invention, a communication configuration wherein client devices may directly send/receive impermanent/function-limiting messages to each other. Impermanent/function-limiting messaging functionality enforcement verification data is initially communicated over one or more cellular and/or one or more distributed networks between the two client devices. Upon authentication of the receiving client device as impermanent/function-limiting messaging functionality capable, the message is directly sent to it by the sending client device. All such messages may thus be subject to impermanent/function-limiting messaging functionality handling and enforcement.

According to some embodiments of the present invention, some or all of the messaging system functionalities may be implemented on a cellular and/or distributed network's gateway or gatekeeper server(s). Accordingly, a gateway or gatekeeper server may comprise an authoring application module, an attribute enforcement module and/or native client attribute enforcement verification/authentication module(s) adapted to verify native client devices' compliance with message attributes enforcement, prior to the forwarding of attribute containing messages to them.

Figure 6C:
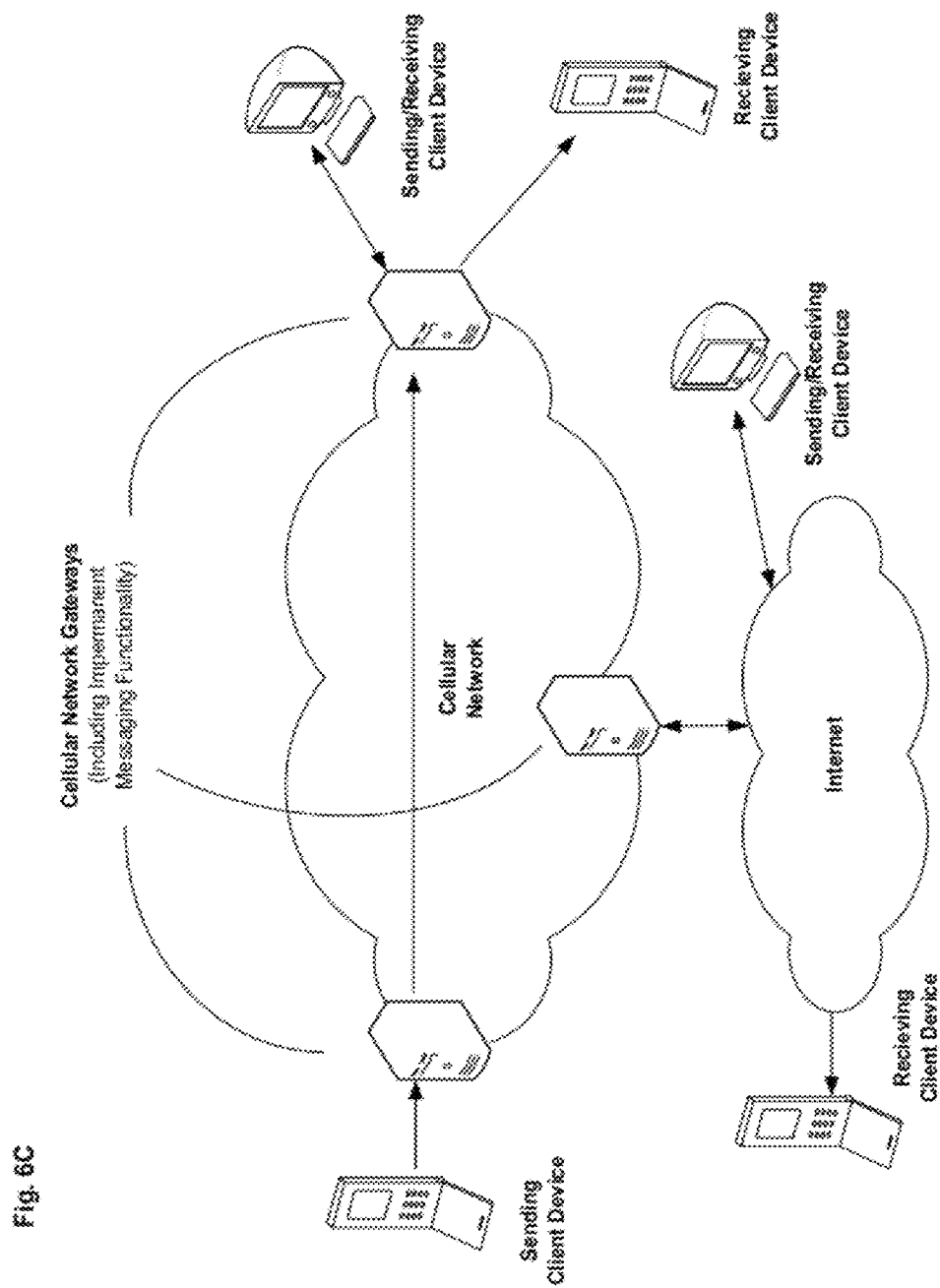

In FIG. 6C there is shown, in accordance with some embodiments of the present invention, a communication configuration wherein cellular network gateways comprise impermanent/function-limiting messaging functionality. A message being sent from a cellular networked device or from an Internet networked device must pass through one of the cellular network gateways, prior to being communicated over the cellular network to one or more receiving client devices, and is thus subject to impermanent/function-limiting messaging functionality handling and enforcement.

Figure 6D:
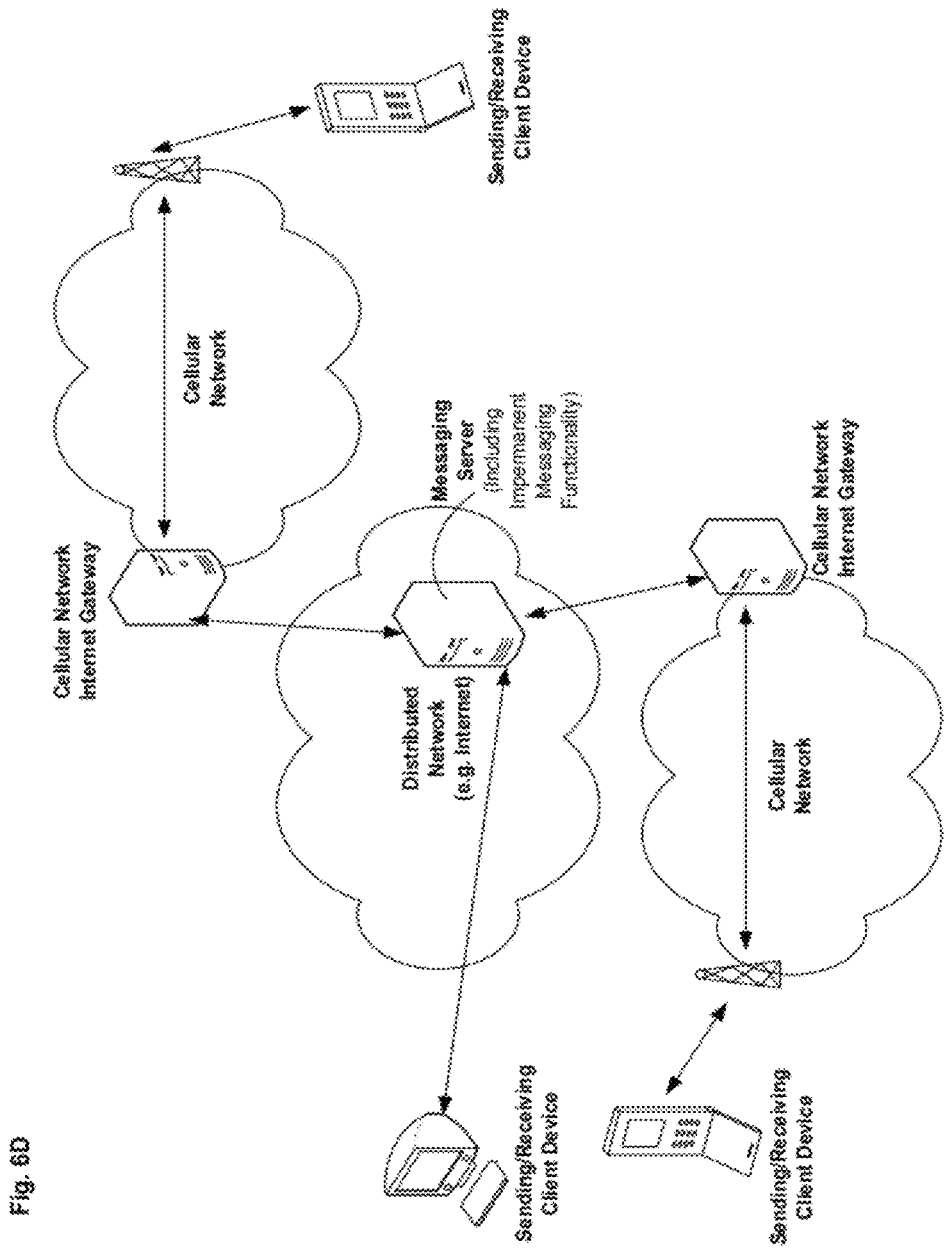

In FIG. 6D there is shown, in accordance with some embodiments of the present invention, a communication configuration wherein client devices of one or more cellular networks and/or distributed networks may send/receive impermanent/function-limiting messages. A message from a distributed network's sending client device is sent through the distributed network's messaging server having an impermanent/function-limiting messaging functionality. The message is then sent to a cellular network Internet gateway and from there, over the cellular network to the cellular receiving client device. A message from a cellular client to a distributed network client may first be sent over the cellular network to the cellular network Internet gateway and to the distributed network receiving client device through the messaging server. All such messages may thus be subject to impermanent/function-limiting messaging functionality handling and enforcement.

Figure 6E:
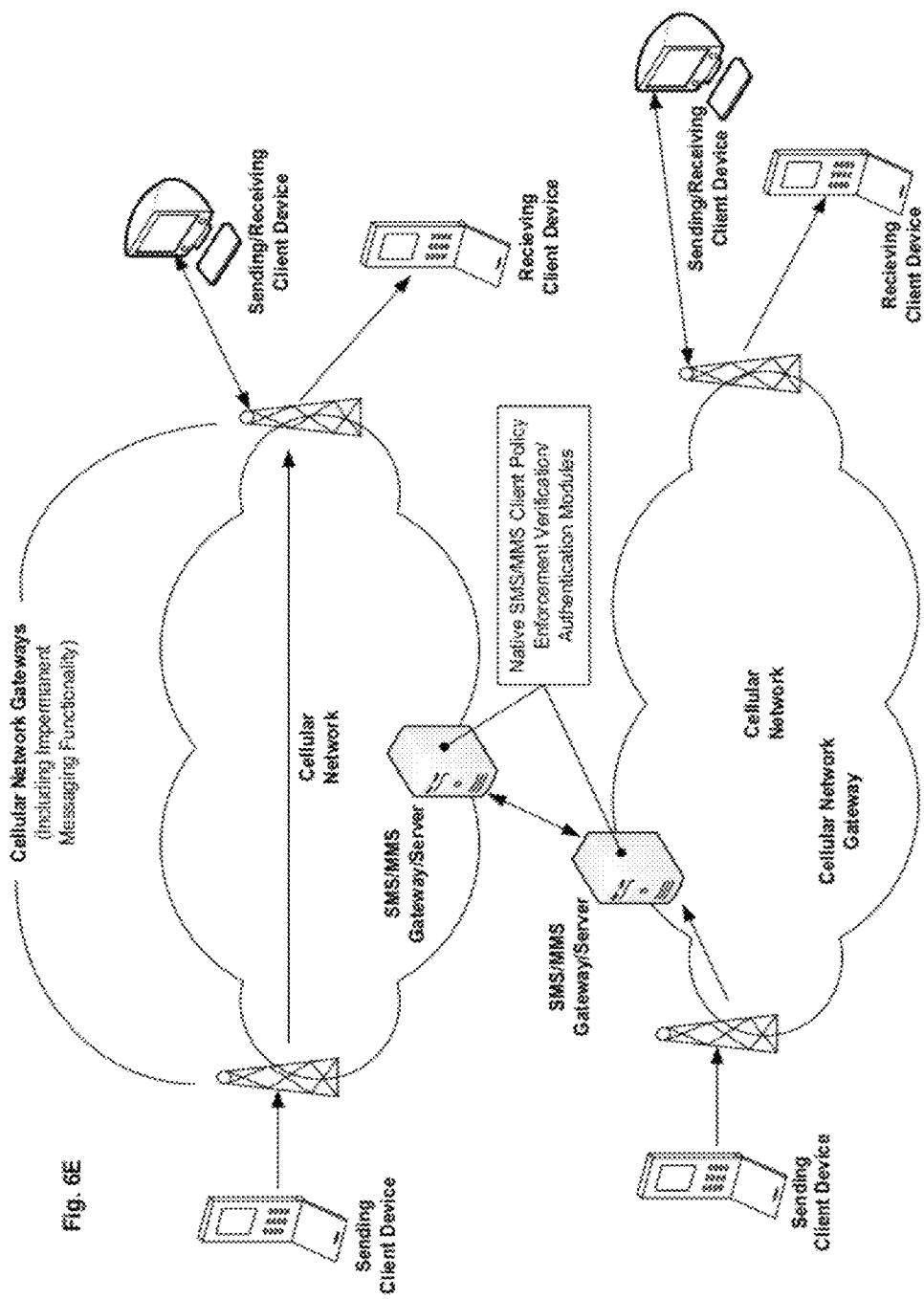

In FIG. 6E there is shown, in accordance with some embodiments of the present invention, a communication configuration wherein client devices of different cellular networks may send/receive impermanent/function-limiting messages to each other. Two or more Native SMS/MMS gateways/servers may comprise enforcement verification/authentication modules adapted to verify the ability of the receiving client device's cellular network gateways to handle and enforce impermanent/function-limiting messaging functionality. Once enforcement capability has been verified, the message may be sent to the receiving client device through its cellular gateway having verified impermanent/function-limiting messaging functionality. All such messages may thus be subject to impermanent/function-limiting messaging functionality handling and enforcement.

Figure 6F:
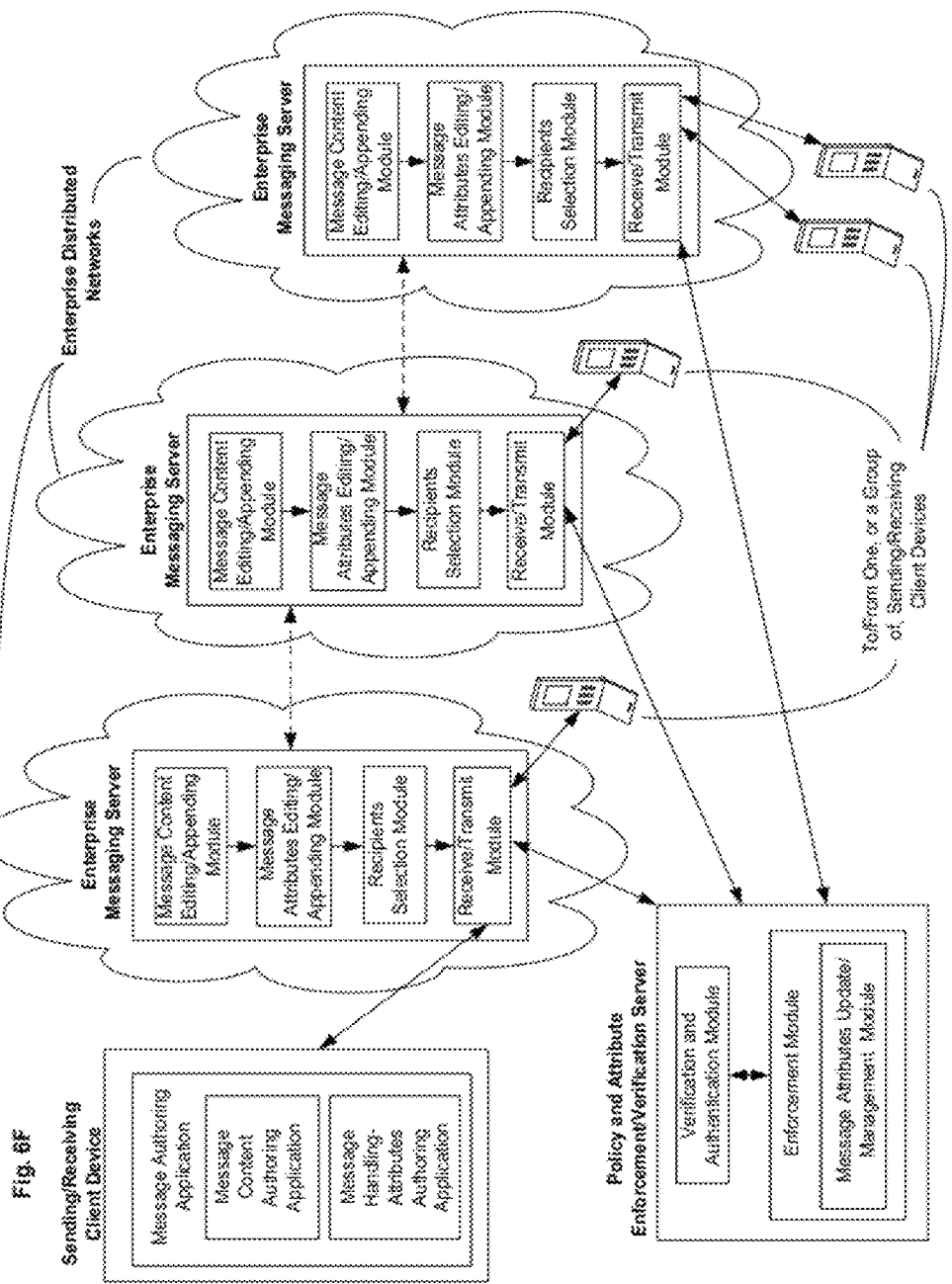

In FIG. 6F there is shown, in accordance with some embodiments of the present invention, a communication configuration wherein client devices of similar and/or different enterprise networks may send/receive impermanent/function-limiting messages to each other. A given client device may initially send a message to its own enterprise's enterprise messaging server, where the message's content and/or attributes may be edited and/or additional content and/or attributes may be appended. The message may then be sent to a policy and attribute enforcement/verification server adapted to either enforce the message's attributes and/or related enterprise policies, or to verify the receiving client device(s)' ability to enforce the message's attributes and/or related enterprise policies. The message may then be sent to the receiving client device(s), which receiving client device(s) may be part of either the same enterprise's network or part of another enterprise network.

In FIG. 6G there is shown, in accordance with some embodiments of the present invention, a direct device to device communication configuration (e.g. peer to peer) wherein each sending and/or receiving device may comprise impermanent/function-limiting messaging functionality. In this exemplary configuration, sending/receiving client devices may be adapted to fallback to a distributed network (e.g. Internet, cellular) and/or an enterprise communication network, when direct transmission functionality is unavailable. It is made clear that various additional impermanent/function-limiting messaging fallback-enabling configurations may be practiced. Impermanent/function-limiting messaging functionality may thus be implemented on two or more communication levels/networks, wherein a first level serves as a default communication configuration and one or more additional levels function as fallback communication configuration(s) for scenarios where the default level is unavailable. Furthermore, moving from one Impermanent/function-limiting messaging communication configuration to another may be partially or fully based on aggregative communication optimization factors (e.g. available transmission bandwidth).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A messaging system comprising:
a first mobile messaging client device executing a messaging application and associated with a first authorized user, the mobile messaging client device having a processor configured to:
  a) receive from a messaging server a notification of the presence of a message at the messaging server, where the message is addressed to the first authorized user;
  b) send to the messaging server a request to retrieve the message, the request including client authentication data, where the first mobile messaging client device sends the request automatically in response to receipt of the notification;
  c) receive the message, the message having message content;
  d) manage the message in accordance with a message attribute, wherein managing the message comprises limiting a functionality of the message based on the message attribute, where the message and the message attribute are stored in non-volatile memory in the first mobile messaging client device at least until the message is managed by the first mobile messaging device in accordance with the message attribute; and
  e) send to the messaging server a message management notification;
the messaging server having a processor configured to:
  a) receive the message addressed to the first authorized user from a second mobile messaging client device executing the messaging application and associated with a second authorized user;
  b) store the message in a database;
  c) transmit to the first mobile messaging client device the notification of the presence of the message at the messaging server;
  d) receive from the first mobile messaging client device the request to retrieve the message, the request including client authentication data;
  e) validate the first mobile messaging client device based on the client authentication data;
  f) transmit the message to the first mobile messaging client device; and
  g) receive from the first mobile messaging client device the message management notification.

2. The system of claim 1, wherein the message management notification is sent from the first mobile messaging client device after the first mobile messaging client device manages the message and indicates the first mobile messaging client device managed the message in accordance with the message attribute.

3. The system of claim 1, wherein the message attribute is set by the second authorized user at the second mobile messaging client device and is transmitted from the second mobile messaging device to the first mobile messaging client device via the messaging server.

4. The system of claim 1, wherein the message management notification is sent from the first mobile messaging client device before the first mobile messaging client device manages the message.

5. The system of claim 1, wherein the message attribute further comprises a predetermined message deletion time, and the predetermined message deletion time is based on a time the first mobile messaging client device first displays the message.

6. The system of claim 1, wherein the message attribute comprises a predetermined message viewing time after which at least a portion of the message content cannot be displayed at the first mobile messaging device, and the predetermined message viewing time is based on a time the first mobile messaging client device first displays the message.

7. The system of claim 1, wherein the message attribute further comprises a number of times the message may be accessed at the first mobile messaging client device.

8. A messaging system comprising a messaging server having a processor configured to:
   a) receive a message from a second mobile messaging client device executing a messaging application and associated with a second authorized user;
   b) store the message in a database;
   c) transmit to a first mobile messaging client device executing the messaging application and associated with a first authorized user, a notification of the presence of the message at the messaging server, where the message is addressed to the first authorized user;
   d) receive from the first mobile messaging client device a request to retrieve the message, the request including client authentication data;
   e) validate the first mobile messaging client device based on the client authentication data;
   f) transmit the message and a message attribute to the first mobile messaging client device, where the message and the message attribute are stored in non-volatile memory in the first mobile messaging client device at least until the message is managed by the first mobile messaging device in accordance with the message attribute; and
   g) receive from the first mobile messaging client device a message management notification generated by the first mobile messaging client device in connection with managing the message in accordance with the message attribute at the first mobile messaging client device.

9. The system of claim 8, wherein the message management notification is sent from the first mobile messaging client device after the first mobile messaging client device manages the message and indicates the first mobile messaging client device managed the message in accordance with the message attribute.

10. The system of claim 8, wherein the message attribute comprises a predetermined message viewing time after which at least a portion of a content of the message cannot be displayed at the first mobile messaging device, and the predetermined message viewing time is based on a time the first mobile messaging client device first displays the message.

11. The system of claim 8, wherein the messaging server is further configured to: prior to f), receive the message attribute from the second authorized user at the second mobile messaging client device.

12. The system of claim 8, wherein the messaging server is further configured to: h) manage the message at the messaging server in accordance with the message attribute.

13. The system of claim 12, wherein in h) the messaging server deletes the message from the database.

14. The system of claim 8, wherein the message attribute comprises a predetermined message deletion time, and the predetermined message deletion time is based on a time the first mobile messaging client device first displays the message.

15. The system of claim 8, wherein the message management notification is sent from the first mobile messaging client device before the first mobile messaging client device manages the message.

16. The system of claim 8, wherein the message attribute further comprises a number of times the message may be accessed at the first mobile messaging client device.

17. A method for managing a messaging system comprising the steps of:
   a) receiving at a messaging server a message addressed to a first authorized user from a second mobile messaging client device executing a messaging application and associated with a second authorized user;
   b) storing the message in a database;
   c) transmitting from the messaging server to a first mobile messaging client device executing the messaging application and associated with a first authorized user, a notification of the presence of the message at the messaging server;
   d) receiving at the messaging server from the first mobile messaging client device a request to retrieve the message, the request including client authentication data;
   e) validating the first mobile messaging client device at the messaging server based on the client authentication data;
   f) transmitting the message and a message attribute from the messaging server to the first mobile messaging client device, where the message and the message attribute are stored in non-volatile memory in the first mobile messaging client device at least until the message is managed by the first mobile messaging device in accordance with the message attribute;
   g) managing the message in accordance with the message attribute at the messaging server; and
   h) receiving at the messaging server from the first mobile messaging client device a message management notification generated by the first mobile messaging client device in connection with managing the message in accordance with the message attribute at the first mobile messaging client device.

18. The method of claim 17, wherein the message attribute comprises a predetermined message viewing time after which at least a portion of a content of the message cannot be displayed at the first mobile messaging device, and the predetermined message viewing time is based on a time the first mobile messaging client device first displays the message.

19. The method of claim 17, wherein the message notification is sent from the first mobile messaging client device after the first mobile messaging client device manages the message and indicates the first mobile messaging client device managed the message in accordance with the message attribute.

20. The method of claim 17, further comprising: prior to f), receiving the message attribute from the second authorized user at the second mobile messaging client device.

21. The method of claim 17, wherein in step g) the messaging server deletes the message from the database.

22. The method of claim 17, wherein the message attribute comprises a predetermined message deletion time, and the predetermined message deletion time is based on a time the first mobile messaging client device first displays the message.

23. The method of claim 17, wherein the message management notification is sent from the first mobile messaging client device before the first mobile messaging client device manages the message.

24. The method of claim 17, wherein the message attribute comprises a number of times the message may be accessed at the first mobile messaging client device.

\* \* \* \* \*

UNITED STATES PATENT AND TRADEMARK OFFICE
CERTIFICATE OF CORRECTION

Page 1 of 1

PATENT NO. : 9,443,227 B2
APPLICATION NO. : 13/063763
DATED : September 13, 2016
INVENTOR(S) : Andrew Brooks et al.

It is certified that error appears in the above-identified patent and that said Letters Patent is hereby corrected as shown below:

On the Title Page

(75) Inventors: should read:
Andrew Brooks, Los Angeles, CA (US);
Brad Brooks, Beverly Hills, CA (US);
Sumeet Bhatia, Los Angeles, CA (US);
Jeffrey Evans, Calabasas, CA (US)

Signed and Sealed this
Seventh Day of August, 2018

Andrei Iancu
*Director of the United States Patent and Trademark Office*